(No Model.)  2 Sheets—Sheet 1.

G. PFANNKUCHE.
AMMETER AND VOLTMETER.

No. 434,032. Patented Aug. 12, 1890.

Witnesses

Inventor
Gustav Pfannkuche
By his Attorney (No Model.) 2 Sheets—Sheet 2.

G. PFANNKUCHE.
AMMETER AND VOLTMETER.

No. 434,032. Patented Aug. 12, 1890.

WITNESSES:
Geo. H. Fraser.
Geo. Dainton

INVENTOR:
Gustav Pfannkuche
By his Attorneys,
Burke, Fraser & Connett

UNITED STATES PATENT OFFICE.

GUSTAV PFANNKUCHE, OF NEW YORK, N. Y., ASSIGNOR TO THE BRUSH ELECTRIC COMPANY, OF SAME PLACE.

AMMETER AND VOLTMETER.

SPECIFICATION forming part of Letters Patent No. 434,032, dated August 12, 1890.

Application filed May 5, 1886. Serial No. 201,161. (No model.)

*To all whom it may concern:*

Be it known that I, GUSTAV PFANNKUCHE, a subject of the Emperor of Austria-Hungary, and a resident of the city, county, and State of New York, have invented certain new and useful Improvements in Ammeters and Voltmeters, of which the following is a specification.

For the measurement of electrical currents or current energy electro-magnetic devices are usually employed. The current to be measured is caused to pass around an iron core, the poles of which are made to deflect either a piece of soft iron or a magnetic needle, and such deflection is observed either directly or by means of translating devices. All such instruments are more or less unreliable, being affected by the variations of terrestrial magnetism and by variations in the strength of the magnetic needle, and being also very liable to interference from neighboring masses of iron or magnets, or by other circuits in proximity to them. To avoid these defects, recourse has been had to the discovery that if a current of electricity is sent through a column of mercury confined in a U-shaped tube and placed in a magnetic field the column will be displaced, standing higher in one leg than in the other, and that this displacement will be proportional to the strength of the current. The rise and fall of the mercury thus becomes a measure of the current passing through it. My invention relates to this mercurial indicator, its object being to so improve it as to produce an accurate, convenient, and generally practicable instrument.

Figure 1:
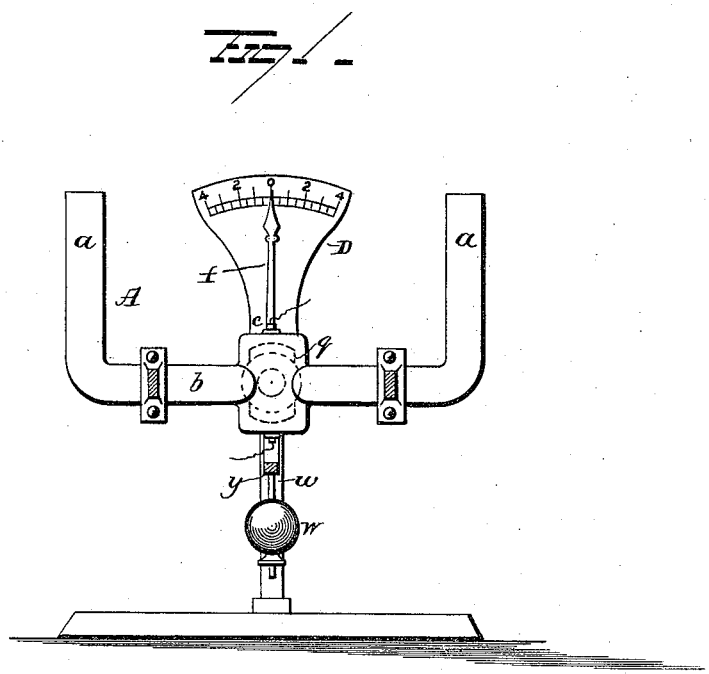
Figure 2:
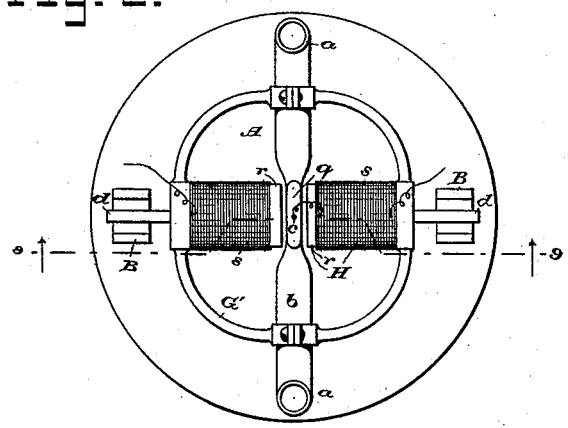
Figure 3:
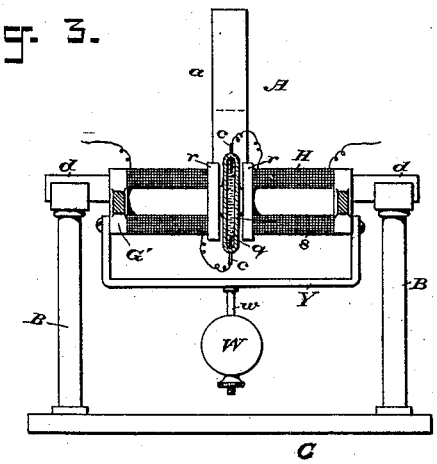
Figure 4:
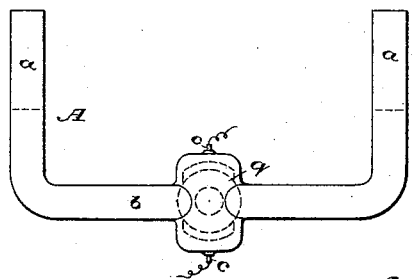

Figure 1 is an elevation of the device. Fig. 2 is a plan view with the pointer and index plate removed. Fig. 3 is a vertical section of the same. Fig. 4 is an elevation of the mercury-tube.

The characteristic feature of my invention is the making of the U-shaped tube containing the mercury movable and hanging it on suitable pivots, so that it may swing or oscillate as the mercurial column is displaced, as hereinafter explained, the extent of deflection or swing of the tube affording the indication of the strength of the passing current. To enable the instrument to be easily read, I provide an index or pointer traversing a graduated scale.

A indicates a U-shaped tube or mercury-holder, preferably of glass, having upright legs $a\ a$ and intermediate portion $b$, which latter is flattened, as at $q$, and extended vertically, so that the mercury in this portion has the form of a flat film in a vertical plane. The leading-in wires $c\ c$ enter the top and bottom of this flat portion $q$, so that the current flows through it either upward or downward. An electro-magnet H is arranged with its N and S poles $r\ r$ close against the opposite sides of the flattened part $q$ and with its coils $s\ s$ in the same circuit with the leading-in wires. The iron frame $G'$ of the instrument serves to magnetically connect the two poles of this magnet and to hold the glass tube A, being itself suspended on knife-edges $d\ d$, which have their bearing on the top of the posts B. A very light hand or pointer $f$ should be fixed to the frame $G'$ in line with the knife-edges or trunnions $d$; or, if desired, said hand may be secured to one of the knife-edges. To the adjacent post should be fixed an index-plate D, as shown in Fig. 1, on which is marked a graduated scale, graduated either for ampères or volts, according to how the instrument is to be used. As the tube tilts, this pointer moves across the scale, thus enabling the strength of the current to be read at a glance. Beneath the mercury-holder and secured to the frame $G'$ is a yoke Y, carrying a depending rod $w$, on which is carried a weight W, adjustable up and down by a nut $n$, which screws on the rod. This is an important and desirable feature of the invention, as it enables the instrument to be adjusted to accord exactly with the graduations on the scale. A passing current excites the magnet, thus bringing the flat film of mercury into an intense magnetic field, and the reaction between the lines of force in this field and those generated by the current passing through the mercury react to force the column of mercury to one side, thus disturbing the poise of the instrument and causing it to assume an inclined position, and thus denote the strength of the current flowing through the instrument according to the extent to which the tube is tilted. The counterbalancing effect of the counterpoise or weight W of course increases progressively with movement of the holder A, which carries it farther from its normal position under the knife-edges until it is sufficient to resist the tendency of the displaced mercury to tilt the said holder A.

Any construction by which the shifting or displacement of the center of gravity of a column of mercury by the passage of an electric current is utilized to move the part of the instrument which contains the mercury so that the extent of its movement will afford a measure or indication of the current will come within the scope of my invention.

The instruments herein described when used as ammeters measure or indicate the volume of the current traversing them in ampères. When one is to be used as a voltmeter, to indicate the electro-motive force, it is necessary to connect it in series with a high-resistance coil.

I claim as my invention—

1. An ammeter or voltmeter comprising a pivoted holder containing mercury, electrical means for displacing said mercury, and means whereby the position of said holder is adjusted progressively in correspondence with the displacement of said mercury, substantially as described.

2. The combination, with a pivoted holder containing mercury and electrical means for displacing said mercury, of a counterpoise whose counterbalancing effect increases progressively with the motion of said holder, substantially as described.

3. An ammeter or voltmeter comprising a pivoted holder containing mercury and circuit-connections for completing an electric circuit through said mercury, in combination with means whereby the current through the said mercury is made to determine the position of said holder, substantially as described.

4. An ammeter or voltmeter consisting of a mercury-holder containing a column of mercury and hung upon pivots, a base from which it is hung, a pointer on one of said parts and a graduated scale on the other, and electrical means for displacing said column of mercury, substantially as set forth, whereby the displacement of the mercury causes a movement of said holder which is indicated on said scale.

5. An ammeter or voltmeter consisting of a mercury holder or tube hung upon pivots with its pivotal axis at or near the level of the mercury when the instrument is at rest and capable of turning on said axis when the column of mercury is displaced by the passage of an electric current, combined with circuit-connections by which said column of mercury is displaced by passage of the electric current to be measured, substantially as set forth.

6. In an ammeter or voltmeter, the mercury-holder hung upon pivots, in combination with an adjustable counter-weight, substantially as set forth.

In witness whereof I have hereunto signed my name in the presence of two subscribing witnesses.

GUSTAV PFANNKUCHE.

Witnesses:
ARTHUR C. FRASER,
GEO. BAINTON.